Figure 1:
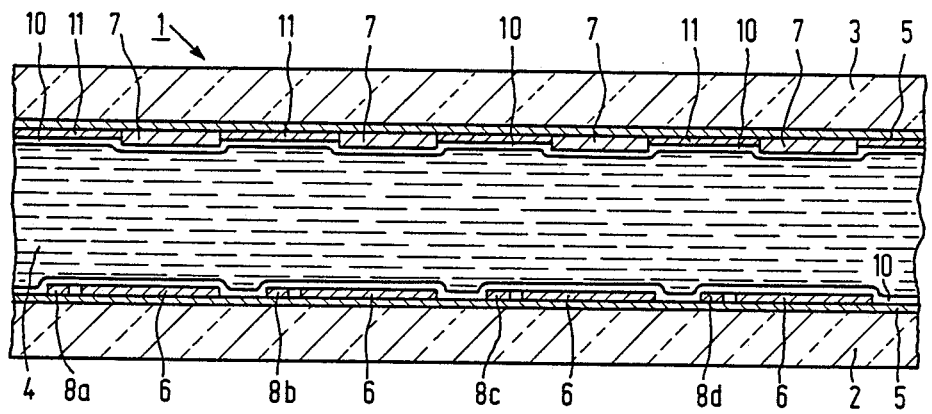

United States Patent [19]

Kuijk

[11] Patent Number: 4,811,006
[45] Date of Patent: Mar. 7, 1989

[54] DISPLAY ARRANGEMENT WITH IMPROVED DRIVE

[75] Inventor: Karel Kuijk, Eindhoven, Netherlands

[73] Assignee: U.S. Philips Corporation, New York, N.Y.

[21] Appl. No.: 913,175

[22] Filed: Sep. 26, 1986

[30] Foreign Application Priority Data

Sep. 30, 1985 [NL] Netherlands ............... 8502663

[51] Int. Cl.⁴ .................................................. G09G 3/02
[52] U.S. Cl. .................................................. 340/719
[58] Field of Search ............. 340/805, 825.81, 825.82, 340/825.94, 784, 785, 787, 718, 719, 811; 350/332, 333, 331 R

[56] References Cited

U.S. PATENT DOCUMENTS

| | | | |
|---|---|---|---|
| 3,654,606 | 4/1972 | Marlowe et al. | 350/332 |
| 4,070,663 | 1/1978 | Kanatani et al. | 350/333 |
| 4,146,876 | 3/1979 | Arellaua et al. | 340/785 |
| 4,203,106 | 5/1980 | Dalisa et al. | 340/787 |
| 4,251,136 | 2/1981 | Mirer et al. | 340/784 |
| 4,680,580 | 6/1987 | Kawahara | 340/784 |

Primary Examiner—Gerald L. Brigance
Assistant Examiner—Richard Hjerpe
Attorney, Agent, or Firm—Paul R. Miller

[57] ABSTRACT

In order to attain that in an LCD display arrangement (TV) the voltage across the picture element (12) is inverted during each TV field period, two diodes (9, 19) per picture element are used, which are each connected to a separate row electrode (8). Each row electrode (8) is common to two rows of picture elements (12). Thus, arbitrary LCD liquids may be used, while the number of row connections is equal to the number of rows of picture elements.

12 Claims, 3 Drawing Sheets

DISPLAY ARRANGEMENT WITH IMPROVED DRIVE

The invention relates to a display arrangement comprising an electrooptical display medium between two supporting plates, a system of picture elements arranged in rows and columns with each picture element being formed by two picture electrodes provided on the surfaces of the supporting plates facing each other, and a system of row and column electrodes for driving the picture elements with the row electrodes being provided on one supporting plate and the column electrodes being provided on the other supporting plate.

It should be noted that in this Application the terms "row electrode" and "column electrode" may be interchanged, if desired, so that, where a row electrode is concerned, a column electrode may also be meant while simultaneously changing column electrode into row electrode.

Such a display arrangement is suitable for displaying alphanumerical and video information by means of passive electrooptical display media, such as liquid crystals, electrophoretic suspensions and electrochromic materials.

The known passive electrooptical display media generally have an insufficiently steep transmission curve with respect to the applied voltage and/or have an insufficient intrinsic memory. These properties lead in multiplexed matrix display arrangements to the number of lines to be driven being limited in order to attain a sufficient contrast. Due to the lack of memory, the information supplied to a selected row electrode via the column electrodes has to be written again and again. Moreover, the voltages supplied at the column electrodes are applied not only across the picture elements of a driven row electrode, but also across the picture elements of all the other rows. Thus, for the time in which they are not driven, picture elements are subjected to an effective voltage which has to be sufficiently small not to bring a picture element into the ON state. Furthermore, with an increasing number of row electrodes, the ratio of the effective voltage to which a picture element is subjected in the ON and in the OFF state, respectively, decreases. Due to an insufficiently steep characteristic, the contrast between picture elements in the ON and the OFF state consequently decreases.

By the use of a switch per picture element, a memory effect is obtained so that the information supplied to a driven row is maintained to a sufficient extent across a picture element for the time in which the other row electrodes are driven, although due to leakage currents information may also be lost in this case.

A display arrangement of the kind mentioned, in which diodes are used as a switch, is known from U.S. Pat. No. 4,223,308.

The use of such display arrangements in television systems may give rise to problems, however. In a generally used control system for television, such as the PAL (NTSC) system, for each frame period of 1/25 sec (1/30 sec) about 575 (525) lines are written and distributed over an even and an odd field of each about 288 (265) lines per 1/50 (1/60) sec. In order to counteract degradation of the liquid crystal material, the latter is preferably controlled alternately with a negative and a positive voltage across the liquid crystal. For a display screen having about 288 (265) lines, it is possible to first drive the picture cells with the information supplied during the odd field period and then with the information supplied during the even field period with the voltage across the picture cell having during the odd field period a polarity different from that during the even field period. Interlacing does not take place, but the second picture line is written over the first picture line, the fourth picture line is written over the third picture line, etc. Information of the same polarity supplied at a picture point is then refreshed and changed in polarity every 1/50 sec (1/60 sec). The number of picture lines on the screen in fact amounts to only half the whole number of lines of the two fields. However, in order to write a complete picture of 575 (525) lines, the picture information must be supplied in interlaced form so that now the information of opposite polarity is refreshed not after 1/50 (1/60) sec with but after 1/25 (1/30) sec, information of the same polarity being supplied every 2/25 (1/15) sec. Due to the fact that the picture cells are now driven for a longer time with the same (positive or negative) voltages, this information can be lost in part due to leakage currents. Furthermore, due to inequalities between positive and negative information, flicker may occur in the picture at a frequency of 25/2 (15) Hz.

The present invention has for its object to provide a display arrangement of the kind mentioned in the opening paragraph, which can be controlled by means of the PAL (NTSC) system without the picture quality being strongly adversely affected by the leakage currents or flicker.

A display arrrangement according to the invention is for this purpose characterized in that in series with each picture element between a column electrode and two successive row electrodes asymmetrically non-linear switching elements are provided between the picture element and each of the row electrodes, while in a column two successive picture elements connected to the column electrode are each time connected via the asymmetrically non-linear switching elements to a common row electrode, the switching elements, viewed from the common row electrode to the other row electrodes associated with two successive picture elements, having the same polarity.

The term "asymmetrically non-linear switching element" is to be understood in this Application to mean in the first instance a diode which is usual in the technology for manufacturing display arrangements, such as, for example, a pn diode, a Schottky diode or a PIN diode made of monocrystalline, polycrystalline or amorphous silicon, CdSe or other semiconductor materials, although other asymmetrically non-linear switching elements, such as, for example, bipolar transistors with shortcircuited base-collector junction or MOS transistors, whose gate is connected to the drain zone, are also not excluded.

As will be shown below, the common electrode permits supplying the information of either an even or odd field to two successive picture cells within a column. When in the next field the other common electrode is selected and the information is supplied with opposite polarity to the column electrode, the average information of two successive even and odd lines is supplied across each picture cell at the field frequency and with alternating polarity. Thus, the display arrangement can be controlled with PAL (NTSC) information while maintaining a high picture quality because due to the high frequency at which the picture information is refreshed, the influence of leakage currents is much smaller, while moreover the picture exhibits less flicker, and furthermore, all picture lines can be displayed. It will further appear that a free choice of electrooptical material is possible, as a result of which any spread in the diode characteristic does not exert any influence.

Figure 2:
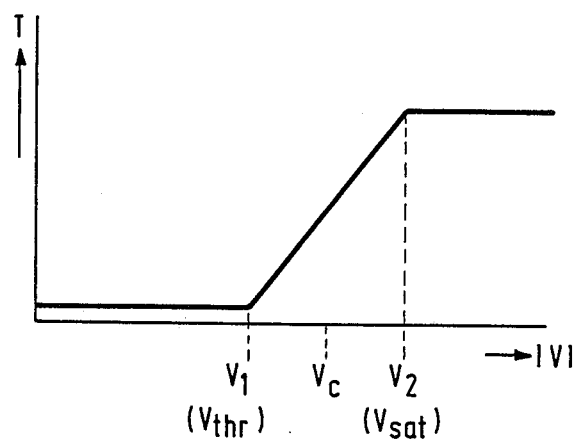
Figure 3:
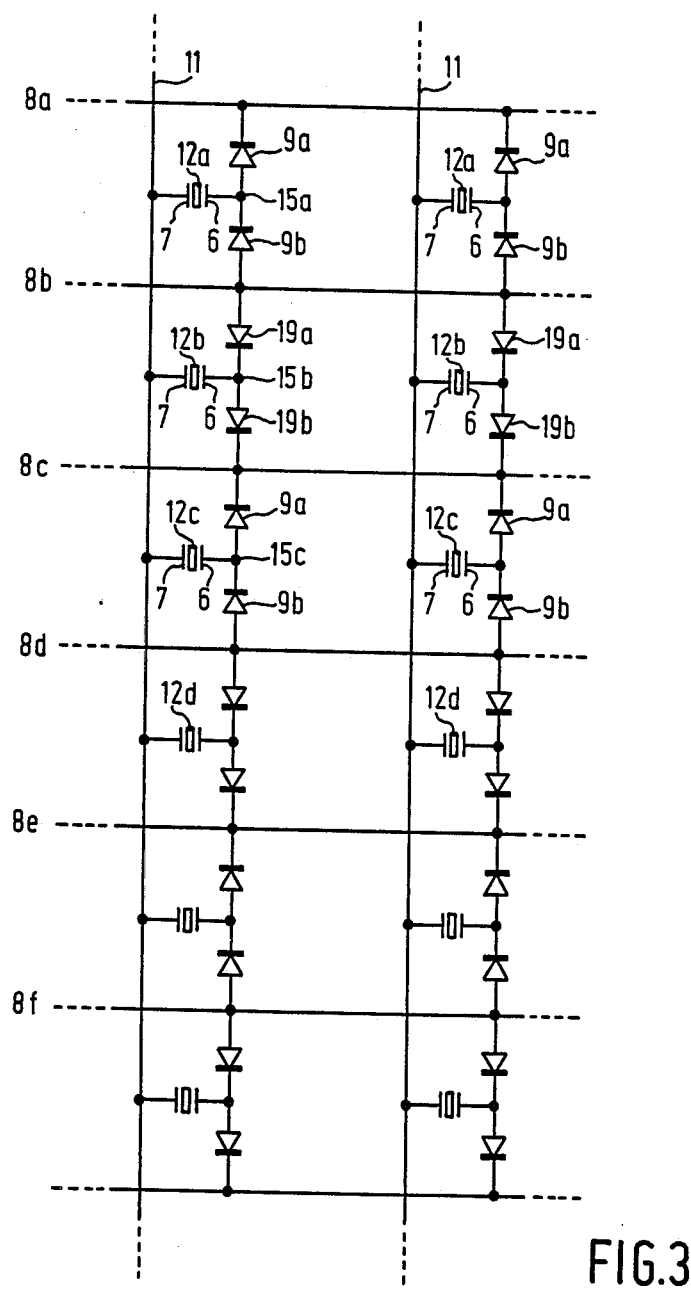
Figure 4:
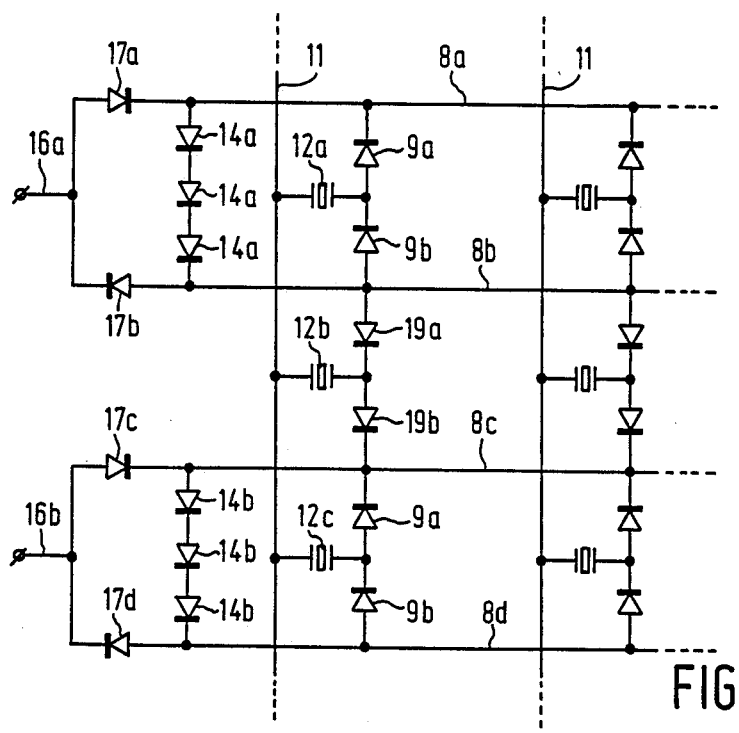
Figure 5:
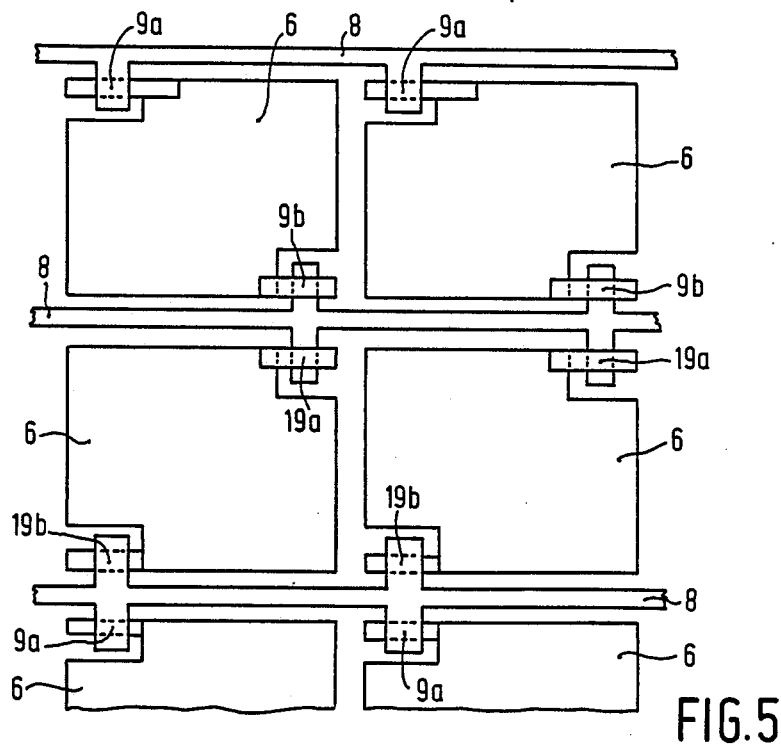

The invention will be be described more fully with reference to a few embodiments and the drawings, in which:

FIG. 1 shows diagrammatically in sectional view a part of a display arrangement according to the invention, FIG. 2 shows diagrammatically a transmission/voltage characteristic of a display cell in such a display arrangement, FIG. 3 shows diagrammatically a part of a control circuit for a display arrangement according to the invention, while FIG. 4 shows a variation thereof, and FIG. 5 shows diagrammatically a part of the electrode structure.

FIG. 1 shows diagrammatically in sectional view a part of a display arrangement 1, which is provided with two supporting plates 2 and 3, between which a liquid crystal 4 is disposed. The inner surfaces of the supporting plates 2 and 3 are provided with electrically and chemically insulating layers 5. A large number of picture electrodes 6 and 7, respectively, arranged in rows and columns are provided on the supporting plates 2 and 3. The oppositely arranged picture electrodes 6 and 7 constitute the picture elements of the display arrangement. Strip-shaped column electrodes 11 are arranged between the columns of picture electrodes 7. Advantageously, the column electrodes 11 and the picture electrodes 7 may be integrated to form strip-shaped electrodes. Strip-shaped row electrodes $8^{a,b}$ are arranged between the rows of picture electrodes 6. Each picture electrode 6 is connected to two row electrodes 8 by means of diodes $9^a$, $9^b$, $19^a$, $19^b$ not shown further in FIG. 1. The diodes 9, 19 provide for the liquid crystal 4 by means of voltages at the row electrodes 8 a sufficient threshold with respect to the voltage applied to the column electrodes 11 and provide a memory for the liquid crystal 4. Furthermore, liquid crystal orientating layers 10 are provided on the inner surfaces of the supporting plates 2 and 3. As is known, a different state of orientation of the liquid crystal molecules and hence an optionally different state can be obtained by applying a voltage across the liquid crystal layer 4. The display arrangement can be realized both as a transmissive and as a reflective arrangement.

FIG. 2 shows diagrammatically a transmission/voltage characteristic of a display cell as present in the display arrangement shown in FIG. 1. Below a given threshold voltage ($V_1$ or $V_{TH}$), the cell practically does not transmit any light, while above a given saturation voltage ($V_2$ or $V_{SAT}$) the cell is practically entirely translucent. It should be noted that, because such cells are generally operated with alternating voltage, the absolute value of the voltage is plotted on the abscissa.

FIG. 3 shows diagrammatically a first embodiment of a part of a display arrangement according to the invention.

Picture elements 12 are connected on the one hand via the picture elements 7 to column electrodes 11, which are arranged together with row electrodes 8 in the form of a matrix. The picture elements 12 are connected via diodes $9^a$, $9^b$, $19^a$, $19^b$ to the row electrodes 8. For example, the row electrode $8^b$ is connected via a diode $9^b$ to a picture element $12^a$ and via a diode $19^a$ to a picture element $12^b$ so that this row electrode $8^b$ is common to the picture elements $12^a$ and $12^b$. Likewise, the row electrode $8^c$ is common to the picture elements $12^b$ and $12^c$ due to the fact that the latter is connected via the diodes $19^b$ and $9^a$ to these picture elements, and so forth.

The arrangement according to the invention functions as follows. During an odd field period, (for example) the lines (row electrodes) $8^a$, $8^c$, $8^e$ etc. are successively selected (in this embodiment made low in voltage). The capacitors constituted by the picture elements $12^a$ are then discharged via diodes $9^a$, depending upon the information at the column electrodes 11, which corresponds to the information of the first picture line. Subsequently, depending upon the information at the column electrodes 11, picture elements $12^b$ are discharged via diodes $19^b$, while moreover picture elements $12^c$ are discharged via diodes $9^a$. The odd lines $8^a$, $8^c$, $8^e$ receive, when they are not selected, such a high voltage and the (even) lines (row electrodes) $8^b$, $8^d$, $8^f$ receive such a low voltage that only the diodes $9^a$, $19^b$ connected to a selected row electrode can conduct and all the remaining diodes are cut off.

During an even field period, the row electrodes $8^b$, $8^d$, $8^f$ etc. are successively selected (made high in voltage), as a result of which capacitors constituted by the picture elements $12^a$ and $12^b$, $12^c$ and $12^d$ etc. are respectively charged with the information at the column electrodes 11 corresponding to the information of the second picture line, the fourth picture line etc., due to the fact that now the diodes $9^b$ and $19^a$ connecting the picture elements 12 to the row electrodes $8^b$, $8^d$ etc. can successively be conducting and the voltages at the remaining selection lines (i.e. the non-selected even lines and the odd lines) are chosen so that all the remaining diodes are cut off.

Thus, each picture element is driven during one complete frame period with the information from an even and an odd field period. Thus, the average information of the first and the second picture line is written at the first row of picture elements $12^a$, the average information of the second and the third picture lines is written at the second row of picture elements $12^b$, the average information of the third and fourth picture lines is written at the third row of picture elements, and so forth.

Due to the construction chosen, it is achieved that during each field period of 20 msec (PAL system) or 16.7 msec (NTSC system), the information is refreshed and changed in polarity, while nevertheless only (n+1) row electrodes (connections) are required with n rows of picture elements. Thus, an LCD display arrangement can consequently be obtained, which is suitable for the reception of PAL signals (575 visible lines) or NTSC signals (525 visible lines). Due to the fact that moreover the voltages of the non-selected row electrodes can be chosen sufficiently high or low so that all the remaining diodes are cut off, an LCD material or another electrooptical material with an arbitrary threshold saturation voltage can be chosen, while the influence of spread in the diode characteristics of the diodes 9, 19 is negligible.

The arrangement shown is more particularly suitable for the use of a control method in which the average voltage across a picture element $V_C=(V_{SAT}+V_{TH})/2$ is chosen (cf. FIG. 2). In this method, the absolute value of the voltage across the picture elements 12 remains practically limited to the range between $V_{TH}$ and $V_{SAT}$. This is described more fully in "A LCTV Display Controlled by a-Si Diode Rings" of S-Togashi et al in SID '84, Digest, p. 324–5.

With this control about $V_C$ and with ON and OFF voltages $V_{ON}$ and $V_{OFF}$, respectively, for the diodes 9, 19 it holds that during the odd field period upon election the point 15$^a$ has to reach on an average a voltage $V_C = -\frac{1}{2}(V_{SAT}+V_{TH})$ and during the even field period has to reach $V_C = \frac{1}{2}(V_{SAT}+V_{TH})$.

The ON voltage $V_{ON}$ is then a voltage at which the current through the diode is sufficiently large to rapidly charge the capacitance associated with the picture element, while the OFF voltage $V_{OFF}$ is chosen so that the associated current is so small that the capacitance is practically not discharged.

A satisfactory operation with regard to gradations (gray shades) is attained if, dependent upon the information at the column electrodes 11, the capacitance constituted by the picture electrode 12$^a$ is charged or discharged during control via the row electrodes 8 to voltage values lying between a maximum voltage $V_C+V_{DMAX}=V_{SAT}$ and a minimum voltage $V_C-V_{DMAX}=V_{TH}$. Elimination of $V_C$ gives $$|V_D|_{MAX}=\tfrac{1}{2}(V_{SAT}-V_{TH}) \quad (a).$$

Upon selection of other picture elements, all the voltages between $-V_{DMAX}$ and $+V_{DMAX}$ can occur at the column electrodes 11. Via capacitive couplings, the maximum and minimum voltages at the junction point 15 are then respectively during odd field periods:

$$V_{MIN}=-V_{DMAX}-V_{SAT} \text{ and}$$

$$V_{MAX}=V_{DMAX}+V_{SAT}$$

When the other row electrodes 8 are selected, the junction points 15 may just not be discharged via other electrodes 8 so that for the odd electrodes it holds that:

$$V_{NONSELodd}+V_{OFF} \geqq V_{MAX}=V_{DMAX}+V_{SAT}$$

or $$V_{NONSELodd} \geqq \tfrac{1}{2}(V_{SAT}-V_{TH})+V_{SAT}-V_{OFF} \quad (b).$$

while for the even electrodes it holds that:

$$V_{NONSELeven}-V_{OFF} \leqq V_{MIN}=-V_{DMAX}-V_{SAT}$$

or $$V_{NONSELeven} \leqq -\tfrac{1}{2}(V_{SAT}-V_{TH})-V_{SAT}+V_{OFF} \quad (c).$$

For the selection voltage it holds that:

$$V_{SELodd}=-\tfrac{1}{2}(V_{SAT}+V_{TH})-V_{ON} \quad (d).$$

$$V_{SELeven}=\tfrac{1}{2}(V_{SAT}+V_{TH})+V_{ON} \quad (e).$$

The information (data) at the column electrodes 11 changes its sign during each field period.

FIG. 4 shows a modification in which the number of line connections is halved by connecting each time two successive row electrodes 8 via diodes 17 connected in series with the diodes 9 with opposite polarity to junction points 16. A series arrangement of diodes 14 is connected antiparallel to the diodes 17 and the series-connected diodes 9$^a$, 9$^b$. The operation of such a diode circuit is described in the co-pending Netherlands patent application No. 8502662, corresponding to U.S. patent application, Ser. No. 910,103, filed Sept. 22, 1986.

During an odd field period, first the driving point 16$^a$ is made low in voltage; and all the remaining points 16 are adjusted so that only the 9$^a$, 14$^a$ and 17$^b$ are conducting. In other words: the capacitor constituted by the picture element 12$^a$ is charged with the information of the first picture line. Subsequently, the driving point 16$^b$ is made low in voltage and the capacitors constituted by the picture elements 12$^b$ and 12$^c$ are charged via the diodes 17$^d$, 14$^b$ and 19$^b$ and 9$^a$, respectively, with the information of the third picture line, and so forth.

During the even field period the voltages change their signs. First the point 16$^a$ is made sufficiently high so that the capacitors constituted by picture elements 12$^a$ and 12$^b$ are discharged (via diodes 17$^a$, 14$^a$ and 9$^b$ and via diodes 17$^a$, 14$^a$ and 19$^a$, respectively), depending upon the information of the second picture line. Subsequently, the capacitors constituted by the picture elements 12$^c$ and 12$^d$ are discharged with the information of the fourth picture line, and so forth.

Thus, again every 20 msec the information at each picture element is refreshed and changed in sign. The average value of the first and second picture lines appears at the first row of picture electrodes, the average value of the second and third picture lines appears at the second row, etc.

If for the ON and OFF voltages of the diodes 9, 14 and 17 $V_{ON}$ and $V_{OFF}$, $V'_{ON}$ and $V'_{OFF}$ and $V''_{ON}$ and $V''_{OFF}$, respectively, are chosen, the following conditions are found to hold (k=number of diodes 14$^a$, 14$^b$).

$$2V_{SAT} \leqq kV''_{OFF}+2V_{OFF}$$

$$|V_D|_{MAX}=\tfrac{1}{2}(V_{SAT}-V_{TH})$$

$$V_{NONSEL} \geqq V''_{ON}-V_{OFF}+V_{TH}+\tfrac{1}{2}(V_{SAT}-V_{TH})$$

$$V_{SEL}=-V''_{ON}-kV_{ON}-V_{ON}-\tfrac{1}{2}(V_{SAT}+V_{TH}).$$

This holds during the odd field periods; during the even field periods, the voltages of $V_{NONSEL}$ and $V_{SEL}$ change their signs, as the data voltage $V_D$.

Finally, FIG. 5 shows a plan view of a possible embodiment of the picture electrodes 6, which are made, for example, of indium tin oxide, while the row electrodes 8 are made, for example, of aluminium or another conductor. Each picture electrode 6 is connected to the row electrodes 8 situated on either side via diodes 9, 19, which are made, for example, of amorphous silicon or another semiconductor material with the diodes 9$^b$, 19$^a$ being contacted, for example, on the upper side by the row electrodes 8 (as the case may be via an intermediate layer) and the diodes 9$^a$, 19$^b$ being contacted on the lower side by the row electrodes 8 so that the desired polarity with respect to the picture electrodes is obtained. In order to obtain an increased reliability, it is of course possible to divide the picture electrodes 6 into several subelectrodes, which are each connected via several diodes 9, 19 to the row electrodes.

Of course the invention is not limited to the embodiments shown here. For example, in FIG. 5, instead of vertical diodes, lateral diode structures may also be used. In this case, no crossing electrodes occur and the risk of shortcircuit is reduced, as a result of which the yield is increased.

Furthermore, for example, diodes may be connected parallel to the diodes 17 in FIG. 4 or to other diodes in order to increase the reliability in operation. Such a parallel arrangement then again fulfils the function of an asymmetrically non-linear switching element. Further, for example, the circuit of diodes 14 in FIG. 4 may be of double construction. Instead of use in liquid crystal display arrangements, the invention may also be used in other display media, such as, for example, electrophoretic and electrochrome display media.

What is claimed is:

1. A display arrangement comprising
   two spaced supporting plates with at least one of said two plates being transparent,
   an electro-optical medium disposed between said two plates,
   an array of picture elements disposed between each facing surface of said two plates, said array being disposed in rows and columns,
   a plurality of picture electrodes disposed on each said facing surface, said plurality of picture electrodes defining said array of picture elements,
   an array of row and column electrodes for driving said picture elements, said row and column electrodes being disposed at least adjacent to said picture elements, wherein said row electrodes are disposed on a facing surface of one of said two plates and said column electrodes are disposed on a facing surface of another of said two plates, and
   at least a pair of asymmetrically non-linear switching elements being disposed in series with each picture element between one of said column electrodes and two successive row electrodes, each of said asymmetrically non-linear switching elements being disposed between one of said picture electrodes and each of said successive row electrodes,
   wherein each two successive picture elements are disposed in a column with a common row electrode therebetween, and wherein each of said two successive picture elements are connected by said each asymmetrically non-linear switching element to said common row electrode,
   said each asymmetrically non-linear switching element being biased in the same direction when viewing from said common row electrode to each opposite row electrode associated with said two successive picture elements.

2. A display arrangement according to claim 1, wherein each of said two successive row electrodes are connected to a common point by further asymmetrically non-linear switching elements, said further asymmetrically non-linear switching elements being connected in series with opposite polarity to said pair of said asymmetrically non-linear switching elements associated with said picture element for each of said two successive row electrodes, and wherein another series arrangement of a number of asymmetrically non-linear switching elements having the same polarity are connected antiparallel to said pair of asymmetrically non-linear switching elements associated with said picture elements and said further asymmetrically non-linear switching elements.

3. A display arrangement according to claim 1 or claim 2, wherein said asymmetrically non-linear switching elements are diodes.

4. A display arrangement according to claim 3, wherein said electro-optical medium is a liquid crystal.

5. A display arrangement according to claim 3, wherein said electro-optical medium is an electrophoretic suspension.

6. A display arrangement according to claim 3, wherein said electro-optical medium is an electrochromic material.

7. A display arrangement according to claim 1 or claim 2, wherein said electro-optical medium is a liquid crystal.

8. A display arrangement according to claim 1 or claim 2, wherein said electro-optical medium is an electrophoretic suspension.

9. A display arrangement according to claim 1 or claim 2, wherein said electro-optical medium is an electrochromic material.

10. A display arrangement according to claim 1 or claim 2, wherein said picture electrodes at said facing surface of said one of said two plates at least partially overlies said row electrodes.

11. A display arrangement according to claim 1 or claim 2, wherein said column electrodes and said picture electrodes on said facing surface of said another of said two plates are integrated to provide a plurality of strip-shaped electrodes.

12. A display arrangement according to claim 11, wherein said picture electrodes at said facing surface of said one of said two plates at least partially overlies said row electrodes.

* * * * *